United States Patent [19]

Warren

[11] 4,029,080

[45] June 14, 1977

[54] THERMAL COLLECTOR OF SOLAR ENERGY ADAPTED FOR HIGH TEMPERATURE OPERATION

[75] Inventor: Roger W. Warren, Pittsburgh, Pa.

[73] Assignee: Westinghouse Electric Corporation, Pittsburgh, Pa.

[22] Filed: Jan. 27, 1975

[21] Appl. No.: 544,605

[52] U.S. Cl. .............................. 126/270; 126/271
[51] Int. Cl.² ............................................. F24J 3/02
[58] Field of Search ............................ 126/270, 271

[56] References Cited

UNITED STATES PATENTS

| | | | |
|---|---|---|---|
| 679,451 | 7/1901 | Baker | 126/271 |
| 1,034,465 | 8/1912 | Kennedy et al. | 126/271 |
| 2,213,894 | 9/1940 | Barry | 126/271 |
| 2,918,709 | 12/1959 | Corcoran | 126/270 |
| 3,250,269 | 5/1966 | Sherock | 126/271 |
| 3,893,506 | 7/1975 | Laing | 126/271 |
| 3,894,369 | 7/1975 | Schmitt et al. | 126/270 |
| 3,918,430 | 11/1975 | Stout et al. | 126/271 |

Primary Examiner—Lloyd L. King
Attorney, Agent, or Firm—E. F. Possessky

[57] ABSTRACT

A thermal collector of solar energy that is adapted for installation in the roof structure of a building includes a cover plate to transmit sunlight, a backing, and an energy-absorbing material carried by the backing, to absorb energy of the transmitted sunlight and to transfer heat of such absorbed energy to the backing. A heat transfer medium delivers heat from the backing to a heat using apparatus such as a building heating or air conditioning system or a heat pump. The backing is designed to limit the weight of the collector and to improve its rate of thermal response upon reappearance of the sunlight. For purposes of limiting heat losses from the backing to the cover plate, the collector is evacuated and components that connect the backing with the cover plate are designed for low heat flow. Thus heat is delivered to the heat using apparatus at an elevated temperature of the heat transfer medium for improved efficiency of such apparatus.

15 Claims, 9 Drawing Figures

THERMAL COLLECTOR OF SOLAR ENERGY ADAPTED FOR HIGH TEMPERATURE OPERATION

BACKGROUND OF THE INVENTION

The present invention relates to thermal collectors of solar energy, and more particularly to such collectors that are adapted for installation in the roof structure of a building.

A thermal collector of solar energy collects energy of the sunshine that is incident upon the collector. The collected energy is transferred as heat to a heat using apparatus such as a heat pump, a home heating or air conditioning system, or steam generating equipment in a power plant.

Typically, a number of thermal collectors is required to collect an amount of energy that satisfies the heat input requirement of the heat using apparatus, and such number usually increases when the heat input requirement is increased. To satisfy the heat input requirement of power plant steam generating apparatus, for example, a large number of collectors is required, covering a substantial area on which sunshine is incident. To satisfy the heat input requirement of a home air conditioning system, as another example, may require a number of collectors so great that the area occupied by the collectors exceeds the roof area of the home. The number of collectors is reduced, however, by raising the efficiency at which heat is used by the heat using apparatus.

Various collector designs have been proposed. In some designs moisture may condense within the collector, limiting the efficiency of collection and diminishing the operating lifetime of collector elements. In other designs a medium which delivers heat to the heat using apparatus may freeze under various low temperature conditions. Still other designs require extensive modification of the roof structure in which the collectors are installed. In one class of proposed collectors, air may leak into the collector, corroding collector elements and diminishing the efficiency of collection.

There appears to be a need for a thermal collector which is adapted to operate at elevated temperatures, to increase the efficiency of the heat using apparatus and thereby to decrease the number of collectors required to satisfy the heat demand of such apparatus, and which is adapted for installation in a roof without extensive modification of the roof structure. It is desirable to provide such a collector whose operating lifetime and efficiency remain undiminished in the face of widely changing conditions of climate to which the collector is exposed.

The description of prior art herein is made on good faith and no representation is made that any prior art considered is the best pertaining prior art nor that the interpretation placed on it is unrebuttable.

SUMMARY OF THE INVENTION

A thermal collector of solar energy includes a thermally conductive backing which carries an energy-absorbing material to absorb energy of solar radiation that is incident upon the material, and to transfer the heat of such absorbed energy to the backing. A translucent window is disposed in relation to the backing to transmit solar radiation to the energy-absorbing material. A space between the backing and the window is hermetically sealed and evacuated to reduce conductive and convective heat losses from the backing through such space to the window, whereby the operating temperature of the backing is raised.

DESCRIPTION OF THE PREFERRED EMBODIMENT

Figure 1:
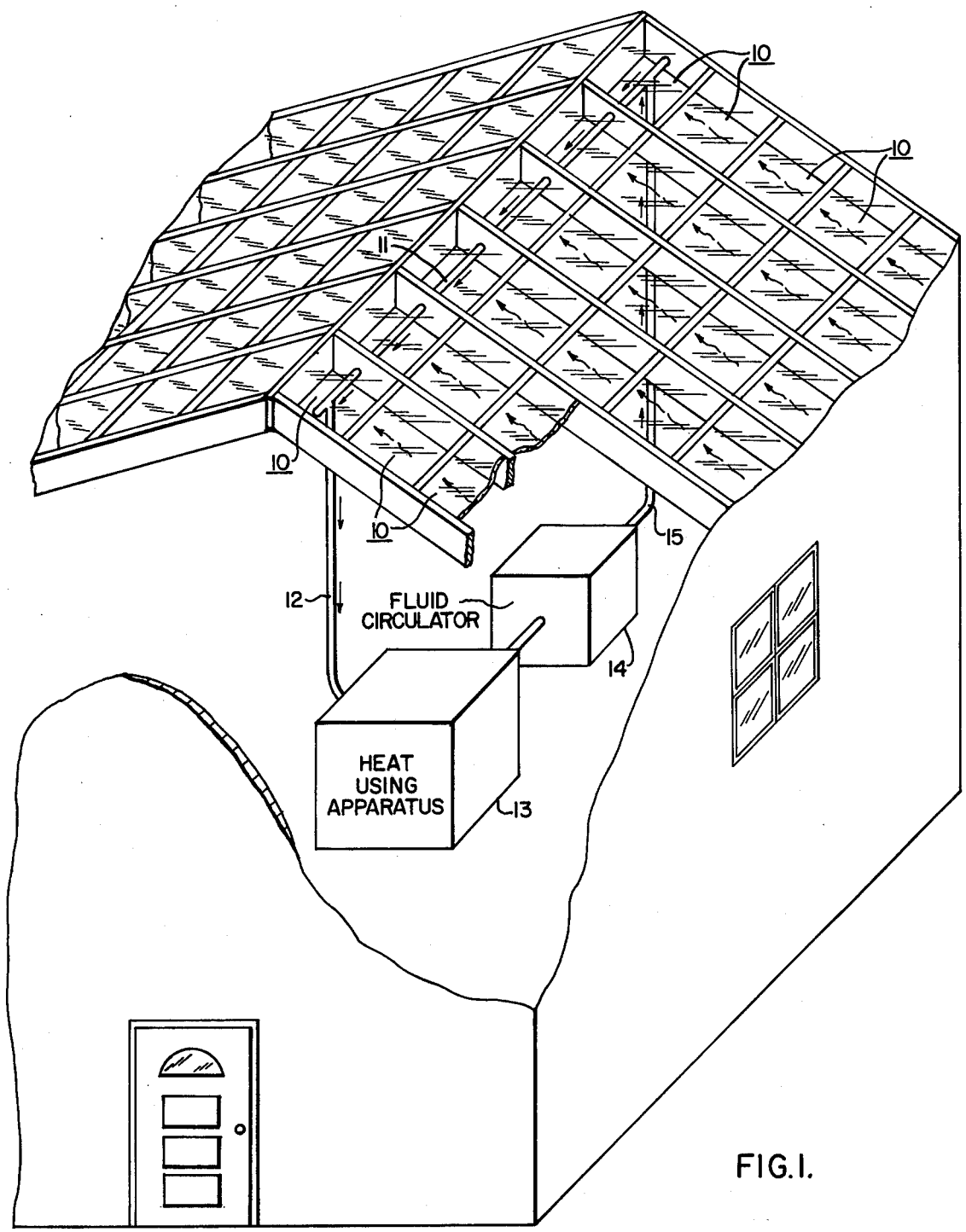
FIG. 1 shows a cutaway view of a building with thermal collectors of solar energy according to the present invention installed in the roof thereof, and means to deliver heat from the collectors to a heat using apparatus.

Referring to FIG. 1 a portion of the roof structure of a building is shown. A plurality of thermal collectors of solar energy is installed in the roof structure shown, each such collector being indicated by the reference number 10. Each collector 10 is adapted to fit over and to attach to adjacent rafters, as later described. The collectors are adapted to form weatherproof joints with another both longitudinally and transversely of the rafters, along the lines shown. Solar radiation is transmitted through a translucent window of each collector 10, and energy of the transmitted radiation is collected (by means not shown) as heat.

Between each pair of adjacent rafters, a flow of coolant air passes beneath the associated collectors and acquires collected heat. In this instance, heated coolant air passes upwardly between adjacent rafters and gives up heat to a fluid-filled tube 11, that is positioned near the ridge of the roof and runs transversely of the rafters. A heat transfer fluid passes through the tube 11 and acquires heat from the flows of heated air that pass upwardly between the pairs of adjacent rafters. Thus, the heat transfer fluid becomes increasingly hotter as it flows through the tube 11 in the direction indicated by the arrows.

Heated fluid passes from an outlet of the tube 11 through a conduit 12 to a heat using apparatus 13, which derives heat from the fluid to heat the building, to air condition the building, or to operate a heat pump or the like. A fluid circulator 14 passes cold fluid from the heat using apparatus 13 through a conduit 15 to an inlet of the tube 11, as shown.

Typically the thermal collectors are installed to extend generally from the eaves (not shown) to the ridge of the roof shown in FIG. 1, in order to deliver as much heat as possible to the heat transfer fluid that flows through the tube 11. Depending upon factors such as the geographical location of the building, thermal collectors may be installed in the second side of the roof as well as the first, in which case the fluid-filled tube 11 is disposed to acquire heat from air currents on both sides of the roof, or a second fluid-filled tube (not shown) is connected in parallel with the tube 11, between the conduits 12 and 15, the purpose of such second tube being to acquire heat from the air flows which cool the collectors that are installed in the second side of the roof.

Each thermal collector 10 is adapted for operation at an elevated temperature, as later described. This adaptation permits the heat transfer fluid in the tube 11 to reach an elevated temperature before it passes through the conduit 12 to the heat using apparatus 13. The elevated temperature of the heat transfer fluid improves the efficiency at which the heat using apparatus 13 uses heat that is collected by the thermal collectors. Such improved efficiency reduces the heat input requirements of the heat using apparatus 13. If the heat input requirement is satisfied by the thermal collectors alone, then such a reduced requirement in turn reduces the number of thermal collectors needed. If the heat input requirement is greater than the thermal collectors can satisfy when all of the available roof area is used for installation of the collectors, then the heat using apparatus 13 requires a supplemental heat input (not shown) so that the heat collected by the thermal collectors and the supplemental heat together satisfy the heat input requirement. In that case, the elevated temperature of the heat transfer fluid desirably reduces the amount of supplemental heat that is required.

The configuration of the ridge and rafter components of the roof structure shown in FIG. 1 is conventional, with the rafters extending downwardly from the ridge to the eaves (not shown). As will be seen the rafters and ridge are not visible from the exterior of the building as shown in FIG. 1, such components being shown in that figure for clarity of illustration.

Figure 2:
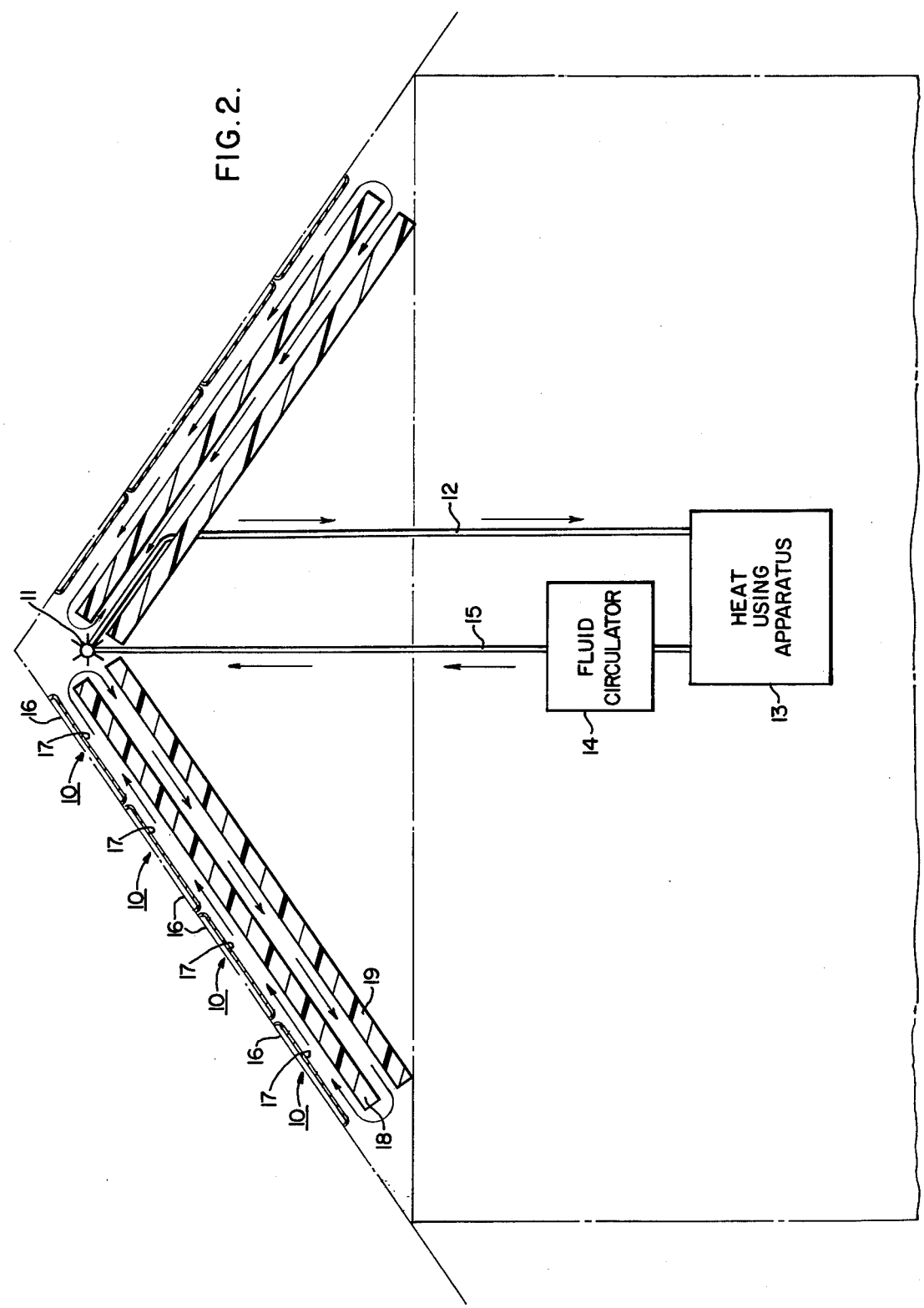
FIG. 2 shows thermal collectors according to the present invention as viewed transversely between adjacent rafters of the roof shown in FIG. 1.

Referring now to FIG. 2 a view of the roof structure transverse of the rafters indicates a plurality of thermal collectors disposed between a pair of adjacent rafters (not shown) and extending upwardly from the eaves toward the ridge, each collector being indicated by the reference numeral 10. The collectors join one and another at weatherproof joints at the points indicated. Each collector 10 includes a translucent window 16, in this case a square glass cover plate approximately 1.2 m. by 1.2 m., which transmits solar radiation to a heat conductive backing 17, in this case steel, which carries on its upper surface an energy-absorbing material (not shown) that absorbs as heat a substantial portion of the energy of the transmitted radiation. The heat of such absorbed energy flows through the heat conductive backing 17 to its lower surface.

A layer insulating material 18 is disposed beneath the backings of the thermal collectors to form a first air passageway between the backings and the insulating layer. A flow of coolant air passes through the first air passageway in heat transfer relation with the lower surfaces of the backings, whereby the flow of coolant air acquires heat from the backings. In this case the flow of coolant air passes upwardly through the first air passageway. At the top of the first passageway heated coolant air imparts heat to the fluid-filled tube 11, as previously described with reference to FIG. 1. The cross section of the tube 11 that is shown in FIG. 2 reveals a plurality of fins which are affixed to the tube 11 to improve heat exchange between the air currents (see FIG. 1) and the heat transfer fluid. This may be attached to the backings to improve heat transfer between the backings and the associated flow of coolant air, in which the fins are generally parallel to the flow of air. The heat transfer fluid passes through the tube 11 and carries heat through the conduit 12 to the heat using apparatus 13, which extracts heat from the heat transfer fluid. From the apparatus 13 cold fluid passes through a fluid circulator 14 and a conduit 15 to the tube 11, where such cold fluid is reheated.

A layer of insulating material 19 is disposed beneath and generally parallel to the insulating layer 18. The space between the insulating layers 18 and 19 is a second air passageway. Air that has imparted heat to the tube 11 is drawn downwardly through the second air passageway, in this case by convection. At the bottom of the second air passageway, air is drawn into the lower portion of the first air passageway. Such air then rises through the first air passageway, where it is reheated by heat transfer with the backings of the thermal collectors, as previously described. It is understood that such an arrangement of insulating layers, thermal collectors, and air current as described is provided between each pair of adjacent rafters, to transfer heat from the backings of the associated thermal collectors to the heat transfer fluid that passes through the tube 11.

Figure 3:
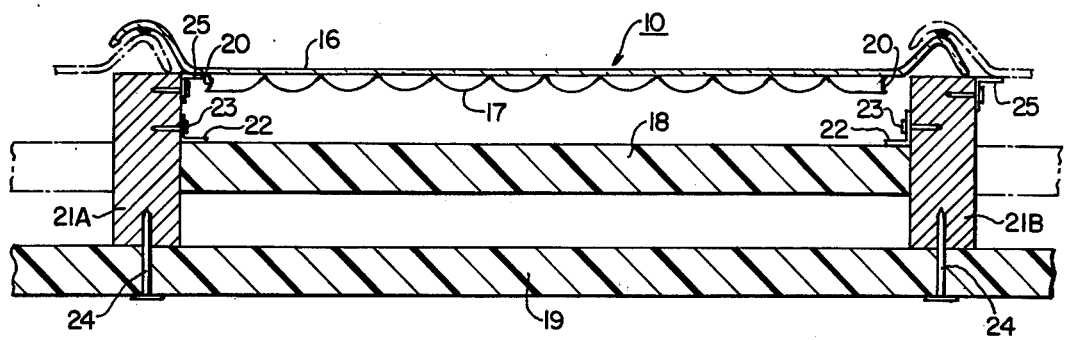
FIG. 3 shows a thermal collector according to the present invention as viewed longitudinally of adjacent rafters of the roof shown in FIG. 1.

Referring now to FIG. 3, there is shown a thermal collector 10 as viewed longitudinally of adjacent rafters. A ridge is formed on each longitudinal edge of the glass cover plate 16 to permit overlap of the cover plates of thermal collectors that are installed adjacent to the thermal collector 10, as shown by the dotted lines. Such overlap assists in forming a weatherproof longitudinal joint between the adjacent thermal collectors. The joints may be rendered further weatherproof by the application of various rubber or plastic sealants. Similar joints are formed between those thermal collectors that are installed above and below the thermal collector 10, between the adjacent rafters shown in FIG. 3.

With further reference to FIG. 3, a continuous rim 20 joins the backing 17 to the cover plate 16 and hermetically seals an evacuated space that is bounded by the cover plate 16, the backing 17 and the rim 20. Evacuation of such space greatly reduces loss of heat from the backing 17 to the cover plate 16, which loss otherwise would result from conductive and convective heat transfer by air entrapped within the space. Elimination of such convective and conductive losses raises the operating temperature of the upper surface of the backing 17, which in turn raises the temperature of the heat transfer fluid as such fluid flows through the conduit 12 to deliver heat to the heat using apparatus 13 (see FIG. 1). In accordance with thermodynamic principles, the efficiency at which the heat using apparatus 13 uses heat that is delivered by the heat transfer fluid normally improves as the temperature of the heat transfer fluid increases. In particular, if the temperature of the heat transfer fluid is represented by $T_h$, (Kelvin) and the heat using apparatus 13 exhausts heat at a temperature of $T_r$, (Kelvin), then the amount of work $W_h$ that is delivered by the apparatus 13 from an amount of heat $Q_h$ that is derived from the heat transfer fluid at temperature $T_h$ is given by: $W_h/Q_h \leq 1 - T_r/T_h$. In the relationship above, the efficiency of the heat using apparatus 13, namely $W_h/Q_h$, is less than or equal to an upper limit that increases when the temperature $T_h$ increases with respect to the temperature $T_r$.

Thus, the efficiency of the heat using apparatus 13 normally increases when the temperature of the heat transfer fluid, $T_h$, increases. As previously discussed, such improved efficiency either reduces the number of thermal collectors that is required to satisfy the heat input requirement of the heat using apparatus 13, or it reduces the amount of supplemental heat that may be required by the apparatus 13 in the event that the heat input requirement cannot be satisfied fully by the totality of thermal collectors.

The backing 17 is disposed beneath the glass coverplate 16 and between adjacent rafters 21A and 21B. The backing 17 is formed from a sheet of thermally conductive material, in this case steel. For purposes of limiting the weight of the assembly comprising the coverplate 16, the backing 17 and the rim 20, the weight of the backing 17 is limited by forming the backing from relatively thin sheet steel, in this case having a thickness of 0.037 cm. Thus, the aforementioned assembly, with a 1.2 m. by 1.2 m. glass cover plate 16 that is approximately 0.93 cm thick, weighs about 45 kg.

The limited weight of the backing 17 correspondingly limits the total mass of the backing, and thus limits the thermal inertia of the backing. The limited thermal inertia of the backing 17 permits the backing to respond quickly to changing sunlight conditions. For example, when the sunlight reappears after a duration of absence, as on a cloudy day, the temperature at the lower surface of a thick backing increases more slowly than the temperature at the lower surface of a relatively thin backing, due to the lower thermal inertia that is associated with the relatively thin backing. Consequently, an increase of the temperature of the heat transfer fluid as such fluid flows through the conduit 12 to the heat using apparatus 13 (see FIG. 1), in response to the reappearance of the sunshine, is desirably more rapid for a relatively thin backing than for a thick backing.

Because the thermal collector 10 is evacuated and hermetically sealed, there is a pressure differential between the upper and lower surfaces of the backing 17, which pressure differential tends to push the backing 17 toward the cover plate 16, especially when the backing is relatively thin. To prevent such structural collapse of the backing 17 due to the pressure differential thereacross, a plurality or projections is formed integrally in the backing, each projection extending from the overall surface of the backing to contact the lower surface of the coverplate 16. A plurality of such projections is shown in FIG. 3.

Figure 4A:
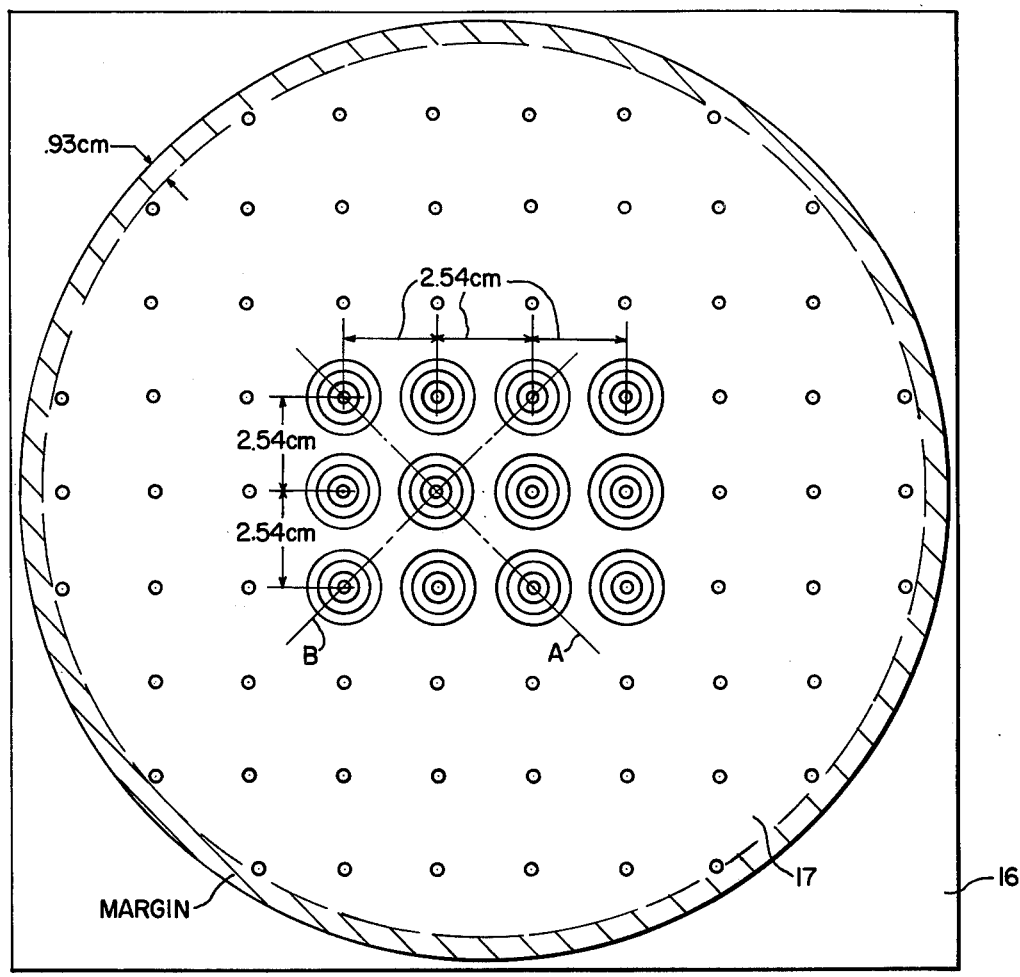
FIGS. 4A–4C show details of a backing that is included in a thermal collector according to the present invention.

FIG. 4A shows the backing 17 as viewed from directly above the cover plate 16 wherein each set of concentric circles is associated with a projection of the backing 17. Each circle is a cross-section of a projection that is taken parallel to the cover plate 16. Because a projection generally tapers inwardly as it extends from the overall surface of the backing 17 to the cover plate 16, sections of a single projection are concentric circles of decreasing diameter as the sections are taken closer to the cover plate 16. Thus, each set of concentric circles corresponds to sections of a single projection that are parallel to the cover plate 16 as taken at various distances from the cover plate. When viewed from above the backing 17, the projections are located in a grid pattern, wherein the distance between the center of the concentric circular cross-sections of a given projection and the center of the concentric circular cross-sections of a neighboring projection is approximately 2.54 cm for a relatively thin backing 17 of approximately 0.037 cm. If the backing 17 is thicker than 0.037 cm, the distance between neighboring projections may be increased, and conversely the distance between neighboring projections may be descreased if the thickness of the backing 17 is less than 0.037 cm. The dots in FIG. 4A indicate that the pattern of projections generally extends over the entire backing 17, except that the outer margin of the backing, shown by the shaded portion within the periphery, is generally flat and has no projections formed therein. The margin is used for installation of the rim 20 (see FIG. 3), as hereinafter described.

Figure 4B:
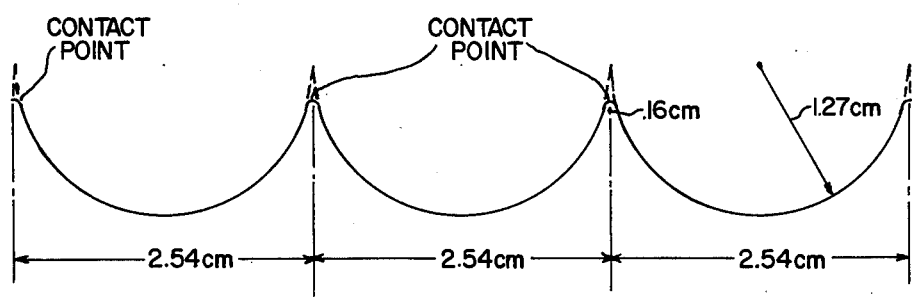

FIG. 4B shows a section of the backing 17 that is perpendicular to the cover plate 16 (not shown) and passes through the line A that is shown in FIG. 4A. The section generally reveals a series of semicircles, each having a radius of curvature of 1.27 cm as shown. The points at which the backing 17 contacts the cover plate 16 are indicated. in the vicinity of a contact point, the radius of curvature of the section changes from 1.27 cm to 0.16 cm. The dotted lines in the vicinity of a contact point are extensions of the semicircles that form the major portions of the section, and are included for purposes of illustration. Because the locations of the projections of the backing 17 form a grid pattern, as indicated in FIG. 4A, it is evident that a section of the backing 17 that is perpendicular to the cover plate 16 (not shown) and passes through the line B shown in FIG. 4A, reveals a pattern of semicircles and contact points of the radius of curvature indicated in FIG. 4B.

Figure 4C:
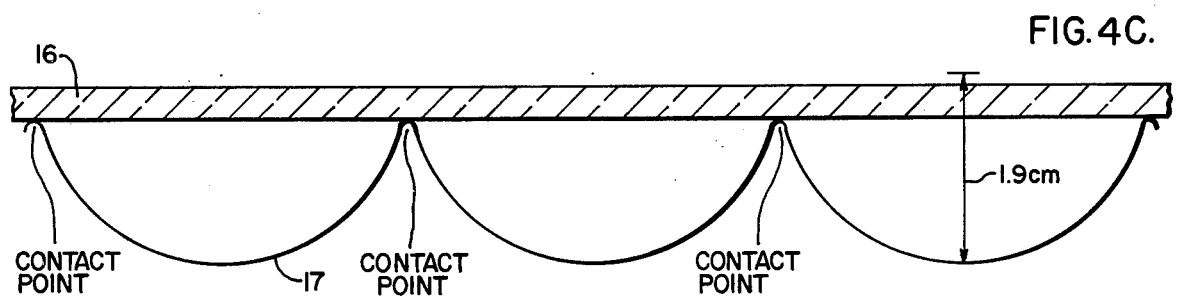

FIG. 4C shows the section of the backing 17 that is shown in FIG. 4B and further includes a section of a portion of the glass cover plate 16. It is seen that the projections of the backing 17 extend upwardly to contact the cover plate 16. The area of contact between the cover plate 16 and a projection of the backing 17 is limited by the reduced radius of curvature of a projection near the contact point (see FIG. 4B). As the thickness of the cover plate 16 is 0.93 cm, the distance from the top of the cover plate 16 to the lowest extremity of the backing 17 is approximately 1.9 cm as shown.

Because each projection is a path through which leakage heat flows from the overall body of the backing 17 to the cover plate 16, the total flow of leakage heat through all of the projections of the backing 17 is desirably much smaller than the flow of collected heat through the backing 17 to its lower surface (see FIG. 2) where such heat is acquired by the flow of coolant air. If such is not the case, the total leakage heat flow lowers the operating temperature of the upper surface of the backing 17, which in turn lowers the temperature of the heat transfer fluid that delivers heat to the heat-using apparatus 13 (see FIG. 1), and the efficiency of the apparatus 13 normally is reduced, as heretofore explained. The small radius of curvature of a contact point, in this case 0.16 cm, reduces the contact area between a projection and the cover plate 16. The reduced contact area reduces the flow of leakage heat through the projection to the cover plate. In addition, the relatively thin backing 17, in this case 0.037 cm, reduces the thermal conductivity of a projection, which in turn reduces the flow of leakage heat through the projection. A calculation of the thermal conductance of a projection of the backing 17 appears in Appendix 1, and it is concluded from such calculation that the total leakage heat flow through the projections of the backing 17 to the cover plate 16 is negligible in comparison with a typical flow of collected heat through the backing 17 to its lower surface.

With reference again to FIG. 3 the layer of insulating material 18 reduces heat losses from the current of air that passes between the backing 17 and the layer 18 (see FIG. 2), and from the backing 17. The insulating layer 18 is disposed generally parallel to the backing 17 and is supported in such position by the rafters 21A and 21B. A plurality of tabs 22 are attached to the insulating layer 13 at longitudinally spaced intervals, to permit attachment of the layer 18 to the rafters. A nail 23, or a similar fastener, extends through each tab 22 to its associated rafter, to fasten the insulating layer 18 to the rafters 21A and 21B.

The insulating layer 19 is disposed beneath and generally parallel to the layer 18. The insulating layer 19 reduces heat loss from the air current that passes between the layers 18 and 19 (see FIG. 2). The insulating layer 19 is affixed to the lower surfaces of the rafters 21A and 21B by a plurality of nails 24. Attachment tabs 25 are affixed to the cover plate 16 and screws or nails project through the attachment tab to an adjacent rafter to hold the collector in place.

Figure 5:
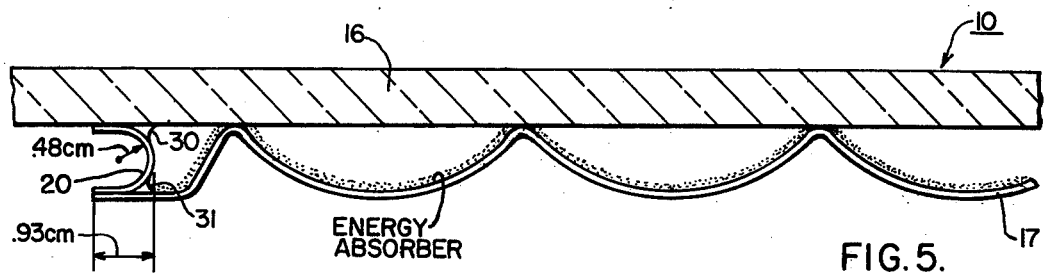
FIG. 5 shows details of an assembled thermal collector according to the present invention.

With reference now to FIG. 5 the rim 20 is joined with the glass cover plate 16 by an airtight seal 30, and with the backing 17 by an airtight seal 31. The seal 30 is preferably frit seal that is formed by applying a powdered glass in a paint solution to the area of contact between the rim 20 and the cover plate 16. With such a solution applied, the assembly of the rim 20 and the cover plate 16 is heated until the powdered glass melts. The melted glass is permitted to solidify, whereupon the airtight seal 30 joins the rim 20 along its upper edge to the glass cover plate 16. Along its lower edge the rim 20, in this case of steel, preferably is soldered to the steel backing 17, thereby forming the airtight seal 31. With reference again to FIG. 4A, the solder seal 31 continuously joins the rim 20 with the backing 17 along the margin of the backing. As previously explained the margin of the backing 17 as shown in FIG. 4A is flat, the projections of the backing 17 being formed within the margin. Thus the margin of the backing 17 is adapted to be joined with the rim 20 by the solder seal 31, which is disposed between the rim 20 and the margin. The rim 20 is itself continuous, and a section of the rim 20 that is parallel to the cover plate 16 is a full circle of diameter somewhat smaller than the diameter of the backing 17 (see FIG. 4A). The frit seal 31 continuously joins the upper portion of the rim 20 (see FIG. 5) with the cover plate 16. During manufacture, the space bounded by the cover plate 16, the backing 17 and the rim 20 is evacuated after the seals 30 and 31 are formed, and the airtight seals 30 and 31 thereafter maintain the vacuum.

With reference again to FIG. 5, the rim 20 preferably is relatively thin, in this case, the thickness of the rim 20 is approximately 0.00254 cm. The cross section of the rim 20 that is shown in FIG. 5 includes a semicircular portion of radius 0.48 cm. The width of the margin of the backing 17, where the rim 20 is joined with the backing, is typically 0.93 cm as shown (see also FIG. 4A). Similarly, the portion of the rim 20 that is joined with the cover plate 16 is 0.93 cm as shown.

An important feature of the rim 20 is its mechanical compliance. The glass cover plate 16 and the steel backing 17 typically possess different temperature coefficients of expansion. When the temperatures of the cover plate 16 and the backing 17 change during the course of operation of the thermal collector 10, the difference between such temperature coefficients causes lateral displacement of the cover plate relative to the backing, thereby deflecting the mechanically compliant rim 20. While a rigid non-yielding rim could break as opposed to deflecting at such times, the flexible rim 20 deflects, i.e., changes its radius of curvature, to permit such lateral displacement without breaking. It is understood that breakage of the rim 20 permits air and moisture to enter the otherwise evacuated space within the thermal collector 10. Air in such space reduces the operating temperature of the backing 17, which in turn reduces the temperature of the heat transfer fluid as it flows through the conduit 12 (see FIG. 1) to the heat using apparatus 13. Both air and moisture in such space may corrode the elements of the thermal selector 10 reducing its operating efficiency and lifetime, as hereinafter discussed.

The rim 20 is a path through which a flow of leakage heat passes from the backing 17 to the cover plate 16. If such flow of leakage heat is not small in relation to the overall flow of collected heat through the backing 17 to its lower surface, then the operating temperature of the upper surface of the backing is reduced by the heat flow through the rim, and in turn the temperature of the heat transfer fluid at the outlet of the tube 11 (see FIG. 1) is reduced. As heretofore explained such temperature reductions normally reduce the efficiency at which the apparatus 13 uses heat. The thermal conductance of the rim 20 is limited by the reduced thickness of the rim, in this case 0.00254 cm. A calculation of the thermal conductance of the rim 20 appears in Appendix 2. The flow of leakage heat through the rim 20 is considered when the performance of the collector 10 is evaluated, as hereinafter discussed. The heat flow through the rim 20 is reduced further when the rim is formed from a steel of relatively low thermal conductivity, such as stainless steel.

With further reference to FIG. 5, the upper surface of the backing 17 carries an energy-absorbing material. Solar radiation is transmitted through the cover plate 16 to the energy-absorbing material, which absorbs as heat a substantial portion of the energy of the transmitted radiation. Such heat passes through the energy-absorbing material to the upper surface of the backing 17, and thereafter the heat flows through the backing 17 to its lower surface, where the heat is acquired by a flow of coolant air (see FIG. 2). The majority of the energy of the transmitted solar radiation is carried by radiation of wavelengths between 0 and 1.4 micron. At wavelengths greater than approximately 1.4 micron, the energy level of solar radiation is relatively low. An ideal energy-absorbing material absorbs all of the energy of solar radiation of wavelengh less than 1.4 micron (an absorptivity of 1.0 over such wavelength range), and absorbs none of the energy of solar radiation of wavelength greater than 1.4 micron (an abosrptivity of 0.0 over such wavelength range). Since it absorbs none of the energy of radiation of wavelength greater then 1.4 micron, the ideal energy-absorbing material also reradiates none of the absorbed energy at those wavelengths, and such zero reradiation permits the upper surface of the backing 17 to operate at desirably elevated temperatures, whereby the efficiency of the heat using apparatus 13 (see FIG. 1) normally is improved.

Typical energy-absorbing materials are nickel oxide and chromium oxide. Nickel oxide or chromium oxide preferably is electrolytically deposited on the backing 17 after the projections are formed therein, and before the rim 20 is joined with the backing 17 by the solder seal 31. An actual energy-absorbing material such as nickel oxide or chromium oxide usually absorbs less than all of the energy of solar radiation at wavelengths less than 1.4 micron, and reradiates some of the absorbed energy at wavelengths greater than 1.4 micron. Such differences between ideal and actual energy-absorbing materials affect the operating temperature of the backing 17 and the efficiency of the heat using apparatus 13 (see FIG. 1) as hereinafter described.

Figure 6:
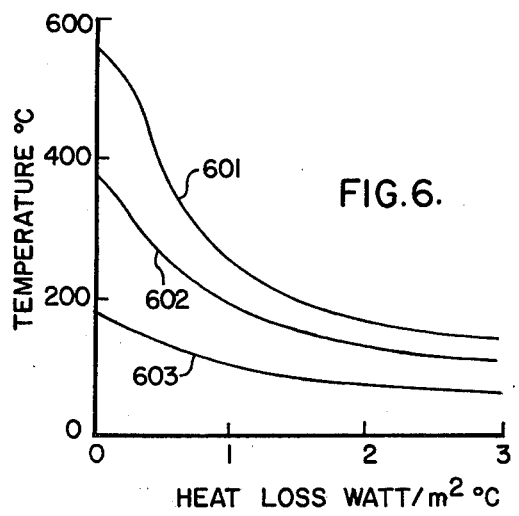
FIG. 6 graphically illustrates one aspect of the performance of a thermal collector according to the present invention.

Referring to FIG. 6 the best operating temperature (centigrade degree) of the thermal collector 10 is graphically shown on the vertical axis in relation to the total heat loss from the collector, shown on the horizontal axis in watts per square meter per centigrade degree. The best operating temperature is that temperature which maximizes the overall efficiency of the thermal collector 10 and the heat using apparatus 13, (see FIG. 1). The total heat loss is the sum of the heat losses through the rim 20 and the projections of the backing 17 (see FIG. 5) and from the lower surface of the backing 17 through the insulating layer 18 (see FIG. 3). The heat loss through the projections of the backing 17, however, is neglected (see Appendix 1). A curve 601 relates to a thermal collector 10 which utilizes an ideal enery-absorbing material as heretofore described with reference to FIG. 5. A curve 602 relates to a thermal collector 10 which utilizes an energy-absorbing material that absorbs 90% of the energy of radiation of wavelength below approximately 1.4 micron, while it absorbs only 1% of the energy of radiation of wavelength greater than 1.4 micron, and thus reradiates relatively little absorbed energy at such wavelengths. For brevity the energy-absorbing material is referred to as the (0.9, 0.01) material. A curve 602 relates to a thermal collector 10 that includes an energyabsorbing material that absorbs 90% of the energy of radiation less than approximately 1.4 micron, while it absorbs 10% of the energy of radiation of wavelength greater than 1.4 micron, for brevity the (0.9, 0.1) material. The (0.9, 0.1) material thus reradiates more absorbed energy at higher wavelengths than the (0.9, 0.01) material.

With respect to the curve 601, elimination of conductive and convective heat losses due to air that is entrapped within the thermal collector 10, changes the heat loss on the horizontal axis from approximately 4.0 (not shown) to approximately 1.0. The best operating temperature correspondingly increases about 150° C to 300° C. Reduction of the heat loss from 4.0 to 1.0 also improves the best operating temperature for the collectors using the (0.9, 0.01) and the (0.9, 0.1) energy-absorbing materials, curves 602 and 603 respectively, but the amount of improvement of the operating temperature decreases as the longer wavelength absorbtivity of the energy-absorbing material increases.

Figure 7:
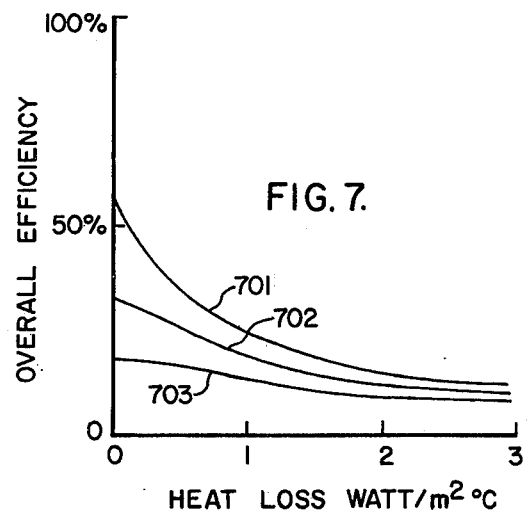
FIG. 7 graphically illustrates another aspect of the performance of a thermal collector according to the present invention.

Referring to FIG. 7 the best percentage overall efficiency of the thermal collector 10 and the heat using apparatus 13 is graphically shown on the vertical axis, in relation to the heat losses from the collector shown on the horizontal axis in units of watts per square meter per centigrade degree. The best overall efficiency is the efficiency that corresponds to the best operating temperature, as shown in FIG. 6. A curve 701 relates to a thermal collector 10 which includes an ideal energy-absorbing material, a curve 702 relates to a thermal collector which includes the (0.9, 0.01) material, and a curve 703 relates to a collector including the (0.9, 0.1) material. A reduction of the heat losses from 4.0 (not shown) to 1.0 by evacuation of the thermal collector approximately raises the best efficiency from 15% to 27%, for a collector which includes an ideal energy-absorbing material (line 701). A similar reduction of the heat losses improves the best efficiency of the collector which includes the (0.9, 0.01) material (line 702) and of the collector which includes the (0.9, 0.1) material (line 703), but the amount of improvement decreases as the longer wavelength absorbtivity of the energy-absorbing material increases.

The performance of the thermal collector 10 which includes nickel oxide or chromium oxide as the energy-absorbing material may be estimated from the curve 603 of FIG. 6 and the curve 703 of FIG. 7. Since the combined heat loss through the rim 20 and through the insulating layer 18 is approximately 1.0 (see Appendix 2) the best operating temperature of the collector is about 150° C and the corresponding best efficiency is approximately 20%. On a bright sunny day the energy level of solar radiation is about 700 watts per square meter. If the thermal collectors and the heat using apparatus 13 (see FIG. 1) operate at the best temperature and efficiency on such a day, then the temperature of the heat transfer fluid is about 150° C at the outlet of the tube 11, and the energy output of the heat using apparatus 13 is approximately 140 watts for each square meter of the surface area of the transparent windows of the thermal collectors that are installed in the roof of the building shown in FIG. 1.

With reference to FIG. 6 the vertical separation of the curves 601, 602 and 603 at 1.0 heat loss show that the best operating temperature of the thermal collector 10 correspondingly increases when reradiation of absorbed energy at longer wavelengths (1.4 micron and greater) decreases. Because a significant part of such energy is radiated from the backing 17 upwardly through the cover plate 16 (see FIG. 2), a coating may be applied to the inner surface of the cover plate 16 to reflect longer wavelength radiation back to the backing 17, and thereby to raise the best operating temperature of the thermal collector. Such a coating, however, must effectively transmit lower wavelength radiation to the backing 17, as the energy of solar radiation is heavily concentrated at such lower wavelengths. Materials that are suitable for application to the inner surface to the cover plate 16 are gold, tin oxide and indium oxide. When such materials are used, they are evaporated onto the cover plate 16.

The aforementioned materials that are applied to the backing 17 and possibly to the cover plate 16 typically are subject to air and moisture contamination and possibly to corrosion, which contamination and corrosion reduce the lifetime of the materials and diminish the effectiveness of the thermal collector. Evacuation of the space bounded by the cover plate 16, the backing 17 and the rim 20 not only desirably reduces heat losses due to air that otherwise would be entrapped in such space, but additionally extends the lifetime of the materials and thereby maintains the collector in an effective operating condition.

The best operating temperature and the corresponding best overall efficiency of the thermal collecotr 10 and the heat using apparatus 13 are improved when an energy-absorbing material of considerably reduced longer wavelength absorbtivity is substituted for nickel oxide or chromium oxide, as described in Ser. No. 552,834, "An Improved Solar Electric Power Plant and an Improved Thermal Collector of Solar Energy for Use Therein", by Roger W. Warren.

Although the present invention is disclosed in a specific embodiment thereof, it is understood that various modifications, changes and substitutions can be made without departing from the spirit and scope of the invention.

APPENDIX 1

The heat loss through a projection is composed of two parts, along the walls of the projection and at its contact with the glass cover 16. The first part can be estimated by considering the wall of the projection to be a cylindrical tube. Its conductance is given by $Q_W = k\pi D\delta/l$. $\delta$ is approximately the thickness of the backing 17 which is taken to be 0.037 cm. $l$ is about 1 cm and D has about the same value. Setting $k = 0.12$ cal/°C cm sec, the conductivity of steel, $Q_W = 0.061$ watt/°C.

The second part of the projection heat loss is the conductance of the contact. The first contact is normally at a microscopic sharp corner. If the pressure at this point increases the stress eventually exceeds the elastic limit of the weakest material at the contact causing its plastic deformation. The deformation continues as the pressure increases so that the area of the contact, A, is continually given by $A = F/P_y$, where F is the force applied, and $P_y$ is the yield strength of the weakest material. Using this description of the contact the thermal conductance of the contact is given roughly by $Q_C \approx rk = \sqrt{F/\pi P_y} \, k$ or $Q_C = \sqrt{P_A/P_y} \times \sqrt{k^2/\pi C}$ because $F = P_A/C$, where $P_A$ is atmospheric pressure and C is the concentration of projections in cm$^{-2}$. Using for k the usual value for mild steel, for $P_y$ its yield point of about 25 kg/mm$^2$, and for C the value corresponding to a 10 cm separation between projections i.e. 0.01 cm$^{-2}$, $Q_C = 0.057$ watt/° C. Now the heat flow path in the glass cover 16 at the contact point is similar to that in the projection itself, and so the conductance in the glass is nearly the same as in the projection except for the greatly reduced ($\approx$50 times) conductivity of glass. The glass conductance is estimated to be $Q_G \approx 0.001$ watt/° C. Finally, the overall projection conductance $Q_D$ is a combination of $Q_W$, $Q_C$ and $Q_G$ and is limited and roughly equal to $Q_G \approx 0.001$ watt/° C. Put in area units, this conductance is given by $Q_G/A = 0.1$ watt/m$^{2o}$ C, a completely negligible quantity.

APPENDIX 2

The remaining important heat loss paths are two: conduction through the rim 20, and through the insulation 18. These two losses are estimated for the 1.2 m by 1.2 m unit and for a reasonable choice of other parameters.

INSULATION LOSS

For a 10 cm thick blanket of rock wool insulation with a conductivity $k = 0.03$ BTU/hr ft° F, use the formula $Q = kA/\delta$, and find a heat conductance given by $Q/A = 0.51$ watt/m$^{2o}$ C. The actual heat loss is likely to be considerably less than this because the air above the insulating blanket will itself be a fair insulator. This is because it is heated from above, and therefore, is not likely to exhibit serious convective instabilities.

Rim Loss

For a rim width W of 1.27 cm and thickness $\delta$, specified below, and a thermal conductivity k of most steels, 0.12 cal/° C cm sec, use $Q = kL\delta/W$ where L, the perimeter of the collector, is 16', and find $Q = 1.9 \times 10^4 \times \delta$ watt/m° C. Now since the rim 20 doesn't afford mechanical support for the backing 17 but only makes a vacuum seal, values of $\delta$ as low as 1 mil give the rim the desired flexibility. Using this value of $\delta$ Q = 0.49 watt/° C, or expressed in the same area units, Q/A = 0.33 watt/m$^{2o}$ C. Since this is a perimeter-related loss, larger collectors have a lower value of Q/A.

I claim:

1. A thermal collector of solar energy adapted for high temperature operation, comprising, a relatively thin thermally conductive backing having relatively low thermal inertia and being disposed for transferring collected heat to an external coolant, a translucent and relatively stiff window to transmit solar radiation, an energy-absorbing material carried by said backing to absorb energy of solar radiation and transfer the heat of such absorbed energy to said backing, first means for supporting said window relative to said backing generally about the window periphery to expose said energy-absorbing material to solar radiation that is transmitted by said window, means for sealing an evacuated space between said window and said backing, and second means for supporting said window relative to said backing over at least one area within the window periphery so as to strengthen said thin backing against pressure differentials resulting from evacuation while limiting leakage of absorbed heat to said window to a relatively low value.

2. A thermal collector according to claim 1 wherein the weight of the collector is reduced and the thermal response of the collector is improved by reducing the thickness of said backing to an extent that said backing is subject to structural collapse due to a pressure differential thereacross, and at least one projection is formed in said backing to extend from the overall surface of said backing to said window to prevent such collapse.

3. A thermal collector of solar energy for installation in the roof structure of a building, and adapted for high temperature operation, comprising, a translucent and relatively stiff cover plate to transmit solar radiation, said cover plate being adapted to fit over adjacent rafters of the roof, a relatively thin thermally conductive backing having relatively low thermal inertia and being disposed for transferring collected heat to an external coolant, an energy-absorbing material carried by said backing to absorb energy of solar radiation and transfer the heat of such absorbed energy to said backing, first means for supporting said backing relative to said cover plate generally about the cover plate periphery to expose said energy-absorbing material to solar radiation that is transmitted by said cover plate, means for hermetically sealing an evacuated space between said backing and said cover plate, and second means for supporting said cover plate relative to said backing over at least one area within the cover plate periphery so as to strengthen said thin backing against pressure differentials resulting from evacuation while limiting leakage of absorbed heat to said cover plate to a relatively low value.

4. A thermal collector according to claim 3 wherein the weight of the collector is reduced and the thermal response of the collector is improved by reducing the thickness of said backing to an extent that said backing is subject to structural collapse due to a pressure differential thereacross, and at least one projection is formed in said backing to extend from the overall surface of said backing to said cover plate to prevent such collapse.

5. A thermal collector according to claim 3 wherein said cover plate is a square glass window.

6. A thermal collector according to claim 5 wherein the periphery of said backing is a circle of diameter less than the separation between opposed sides of adjacent rafters, whereby said backing is received by the space between adjacent rafters.

7. A thermal collector according to claim 6 wherein said means for supporting and hermetically sealing includes a continuous rim having a first portion that is continuously joined with said backing, and a second portion that is continuously joined with said cover plate.

8. A thermal collector according to claim 7 wherein the thickness of said rim is reduced to an extent that a flow of heat through said rim from said backing to said cover plate, is substantially less than the flow of heat from said energy-absorbing material to said backing.

9. A thermal collector according to claim 3 wherein said supporting sealing means is mechanically compliant, to permit said cover plate to move laterally with respect to said backing, due to a difference between the temperature coefficients of expansion of said cover plate and said backing, without breakage of said supporting and sealing means, which breakage would permit air to enter the collector and reduce its operating temperature.

10. A thermal collector according to claim 3 wherein said first supporting means comprises a material of low thermal conductance, whereby a flow of leakage heat through said connecting means from said backing to said cover plate is substantially less than the flow of heat from said energy-absorbing material to said backing.

11. Apparatus for collecting solar energy and delivering the collected energy to a heat using apparatus, said collecting apparatus being adapted for installation between adjacent rafters of a roof, comprising,
- a translucent cover plate to transmit sunlight, said cover plate being adapted to fit over adjacent rafters,
- a relatively thin backing of thermally conductive material adapted to be disposed beneath said cover plate and between adjacent rafters,
- an energy-absorbing material carried by said backing to absorb energy of solar radiation and transfer the heat of such absorbed energy to said backing,
- first means for supporting said cover plate relative to said backing generally about the cover plate periphery to dispose said backing between adjacent rafters and beneath said cover plate, whereby said energy-absorbing material is exposed to solar radiation that is transmitted by said cover plate, means for hermetically sealing an evacuated space between said backing and said cover plate,
- means for transferring heat from said backing to the heat using apparatus, and second means for supporting said window relative to said backing over at least one area within the window periphery so as to strengthen said thin backing against pressure differentials resulting from evacuation while limiting leakage of absorbed heat to said window to a relatively low value.

12. Apparatus according to claim 11 wherein the weight of the apparatus is reduced and the thermal response of the apparatus is improved by reducing the thickness of said backing to an extent that said backing is subject to structural collapse due to a pressure differential thereacross, and at least one projection is formed in said backing to extend from the overall surface of said backing to said cover plate to prevent such collapse.

13. Apparatus according to claim 11 wherein said heat transferring means include,
- a layer of insulating material disposed beneath said backing to form a first passageway between said layer and said backing, and
- means to pass a flow of heat transfer fluid through the first passageway, such flow being in heat transfer relation with said backing.

14. Apparatus according to claim 13 wherein said heat transferring means further include,
- a plurality of fins attached to said backing to improve heat transfer between said backing and the flow of heat transfer fluid.

15. Apparatus according to claim 11 wherein said heat transferring means include,
- a first layer of insulating material disposed beneath said backing, and extending laterally between adjacent rafters, said first layer being spaced from said backing to form a first air passageway,
- a second layer of insulating material disposed beneath said first layer and extending laterally between adjacent rafters, said second layer being spaced from said first layer to form a second air passageway,
- a circulating current of air convected upwardly through the first passageway and downwardly through the second passageway, said current being in heat transfer relation with said backing as it passes through the first passageway, and
- means for extracting heat from said air current as it emanates from the first passageway and delivering the extracted heat to the heat using apparatus.

* * * * *